Patented Apr. 18, 1944

2,346,909

UNITED STATES PATENT OFFICE 2,346,909

WATER SOFTENING MATERIAL AND THE MANUFACTURE THEREOF

Svein Dahl-Rode, New York, N. Y.

No Drawing. Application May 6, 1940,
Serial No. 333,603

6 Claims. (Cl. 252—181)

This invention relates to water-softening materials, namely materials which are adapted to remove from water substances which impart so-called "hardness" to water. This invention also relates to method of manufacturing water-softening materials.

Water frequently contains minerals, particularly soluble compounds of calcium and magnesium which impart hardness to water. Various expedients have been resorted to for removing such impurities from water so as to make the water more suitable for drinking, use in boilers, use in laundering and the like. In order to remove hardness from water many different base exchange compounds have been proposed and utilized heretofore that are adapted to remove the soluble compounds of calcium, magnesium and the like from hard water. Base exchange compounds which remove water-hardening materials from water with simultaneous liberation of alkali metal compounds that are not regarded as harmful in the water are usually known as zeolites. Zeolites occur both naturally and as a result of chemical synthesis. The most generally used zeolites are complex compounds containing an alkali metal, together with aluminum or silicon or both. When such compounds are placed in contact with hard water as by causing the hard water to flow through a granular mass of zeolite material, the mineral salts causing the water hardness are converted into soluble compounds which remain on the zeolite and at the same time the alkali metal component of the zeolite is liberated. After the zeolite material has been exhausted by contact with hard water, it may be revived or regenerated by treating it with a suitable source of soluble alkali compound, e. g. sodium chloride, which is adapted to displace the deposited compounds of calcium, magnesium and the like and restore the original alkali content of the zeolite material.

I have found that coffee particles which carry or have incorporated therewith a substance adapted to remove from hard water the materials that impart hardness thereto, constitute an excellent water-softening material. Coffee particles have the capacity to remain substantially unaffected after long contact with water and thereby afford an excellent vehicle through which water may be passed in a water-softening process. Moreover, coffee particles contain mineral substances which I have found may be utilized as a component of a desirable base exchange water-softening material. Furthermore, according to the present invention, used coffee grounds which have heretofore been regarded merely as a waste material and which are, therefore, very inexpensive, constitute the bulk of the new water-softening material.

The coffee particles which may be used according to this invention may be either raw or roasted, ground or unground and either before or after use of coffee for the preparation of a beverage. Preferably, the coffee that is used is coffee that has been ground to a granular condition inasmuch as the ground coffee particles are more porous and therefore are more readily treated according to this invention and after treatment accomplish more rapid water-softening than do coffee particles which have not been ground. Coffee which is in the form of beans or is in a ground condition is regarded herein as being in particle form. It is preferable to use coffee particles that have been utilized in the preparation of a beverage and from which soluble flavoring and coloring material has been removed.

As illustrating the practice of this invention, a highly satisfactory water-softening material can be prepared merely by treating coffee particles so as to incorporate therewith an alkali metal compound adapted to remove water-hardening material from hard water. For example, coffee grounds which have been treated with an alkaline solution of an alkali metal compound, e. g. a caustic soda solution, a soda ash solution or a solution of tri-sodium phosphate is well suited for use as a water-softening material. The resulting product has water-softening characteristics due to the alkali that is absorbed or adsorbed by the coffee particles. Moreover, it is believed that some of the alkali reacts with the mineral in the coffee particles to form a base exchange material. The water-softening material thus prepared may be used in the manner of a zeolite in that after the product has been used for softening hard water until it is substantially exhausted, the product can be revivified by treating it with an alkali metal salt solution, e. g. a solution of sodium chloride. Moreover, coffee particles which have merely been treated with ordinary salt solution or other substantially neutral alkali metal salt solution will be found to have at least some water-softening characteristics, a fact which indicates that the alkali metal reacts with mineral in the coffee particles to form a base exchange compound of the zeolite type. It is preferable, however, to treat the coffee particles with a soluble alkali metal compound having definite alkaline characteristics inasmuch as by so doing the water-softening capacity of the product is considerably increased.

Preferably, the coffee particles are treated so as to incorporate therewith an aluminum compound of the zeolite type. For example, coffee particles may be treated according to this invention not only with alkali but with a compound of aluminum such as sodium aluminate. When the coffee particles are treated with an alkaline solution and with a compound of aluminum of the character referred to, the resulting product has excellent water-softening properties and can be regenerated repeatedly for reuse. Especially when a compound of aluminum is incorporated, the coffee particles are preferably dried prior to use as a water-softening agent in order that the coffee particles may be contracted to a very firm granular condition that is easy to handle and permits of a rapid flow of water therethrough when used in softening hard water. Preferably the particles are washed with water prior to drying to remove excess free alkali.

In preferred practice of this invention, coffee particles not only carry a compound of aluminum but also a compound of silicon, e. g. an alkali metal silicate. For example, the coffee particles may be preliminarily treated with alkali and with a compound of aluminum and thereafter treated with sodium silicate solution, preferably after having previously dried the coffee particles after incorporating therewith the alkali and the aluminum compound.

The following examples are illustrative of the practice of this invention. According to a preferred way of practicing this invention, coffee grounds, that is coffee which has been roasted and ground and which has been used in the preparation of coffee as a beverage, are first treated with a 20% solution of sodium hydroxide in the presence of metallic aluminum. The treatment may be carried out in an aluminum vessel; or aluminum may be added to the solution before or after it is brought into contact with the coffee, for example, 100 grams of aluminum to a quart of the solution. The sodium hydroxide solution of the concentration mentioned reacts with the aluminum to form a soluble aluminum compound believed to be sodium aluminate which together with the caustic soda becomes deposited in the coffee grounds. It is merely necessary to cover the coffee grounds with the solution. After the coffee grounds have been immersed in the solution for a sufficient period of time, e. g. about one hour, to become impregnated therewith, the excess solution is removed from the coffee grounds as by draining. The solution that is drained off may be reused in treating additional coffee grounds, any additional sodium hydroxide and aluminum being added as required to bring the solution up to desired concentration. When metallic aluminum is used it is advantageous to use a caustic alkali solution of sufficient strength to attack the metal fairly vigorously so that the process can be carried out rapidly. It is not essential that the metallic aluminum be in finely divided form. For example substantially the same effect can be attained by carrying out the process in an aluminum container. By the use of metallic aluminum instead of aluminum salts and the like the formation of non-useful reaction products in the treating solution is avoided.

Instead of treating the coffee particles simultaneously with alkali and aluminum, the coffee particles may be treated successively with alkaline solution such as a solution of caustic soda, soda ash, trisodium phosphate or the like and with a solution of an alkali metal compound of aluminum separately prepared. Separately prepared alkali metal aluminate by itself may be applied to coffee particles but the water-softening capacity of the product is somewhat less than when the coffee particles are likewise treated with a solution containing a substantial amount of free alkali.

The coffee grounds treated as above mentioned can be used as they are and afford an excellent water-softening material. Preferably however they are washed with water to remove excess free alkali. Moreover, the treated coffee grounds preferably are dried in the atmosphere or in an oven at a temperature sufficiently low so as to not adversely affect the coffee particles, e. g. at a temperature below about 100° C. When the coffee particles treated as aforesaid are dried, I have found that the coffee particles tend to shrink or contract by as much as about 65% of their original size to form a mass of firm, dense granules which can be readily handled and transported. When the water-softening material is used in a water-softening operation, the granules may expand to approximately four times their size, but this does not adversely affect the rapidity with which the water can be passed through the water-softening material.

Water-softening material prepared as above described and as in succeeding examples can be used in the usual way by passing a current of water downwardly through a mass of the water-softening material. The base exchange reaction by which water-hardening material is removed from the water is very rapid and water can be passed through the water-softening material with a very free flow. For example, I have found that satisfactory softening of hard water can be accomplished at the rate of about twenty-five gallons per cross-sectional square foot of water-softening material per minute. When the capacity of the water-softening material to remove water-hardening materials from the hard water has been largely exhausted, the water-softening material can be revivified by treatment with sodium chloride solution. For example, a 2% solution of sodium chloride may be caused to flow through the mass of water-softening material and thereby revivify it for reuse very rapidly. The water-softening material can be reused and revivified again and again and lasts much longer than ordinary zeolite and becomes discolored to a lesser extent.

As another example of the present invention, water-softening material may be prepared as described in the preceding example and thereafter treated with the sodium silicate solution, e. g. a 10 to 20% solution of sodium silicate for about one hour or more, preferably about five hours. The sodium silicate solution may be applied to the coffee grounds either before or after the coffee grounds treated as in the preceding example have been dried. Preferably, however, the sodium silicate is applied to the coffee grounds after they have been dried following the treatment described in the preceding example. Water-softening material manufactured by utilizing sodium silicate according to the present example is to be preferred inasmuch as optimum conditions of combined effectiveness and durability in use are afforded.

As a further example of the practice of this invention, coffee grounds may be treated merely with a solution of an alkali metal silicate, e. g. a 10 to 20% sodium silicate solution preferably for about five hours or more. The resulting product may be used as a water-softening material preferably after drying which tends to shrink and harden the particles. The product thus prepared may be given greater water-softening capacity if the alkalinity of the silicate solution is increased by the addition of a more highly alkaline material, e. g. caustic soda or soda ash. Alternatively, the coffee grounds can be treated successively with an alkaline solution and with a solution of sodium silicate, e. g. by first treating the coffee grounds with a 10 to 20% solution of an alkaline alkali metal compound such as sodium hydroxide or soda ash and thereafter with sodium silicate solution.

As another example of this invention coffee particles may be soaked in a concentrated alum solution, then washed, and dried to afford a water-softening material suitable for certain purposes.

As above mentioned and as illustrative of a very simple way of preparing water-softening material according to this invention, coffee particles such as coffee grounds may be merely treated with an alkaline material such as with a 10 to 20% solution of trisodium phosphate or soda ash. In such case, the product has valuable water-softening characteristics but does not exhibit as great capacity for regeneration as do the water-softening materials produced according to the preceding examples. When the coffee particles are treated with an alkaline solution it is believed that some of the alkali is taken up by mineral naturally occurring in the coffee so as to occur in the form of a complex double salt such as $Na_2O.2SiO_2.Al_2O_3.XH_2O$ although the precise chemical composition of the resulting material is not definitely known. The resulting composition may be in the form of a mixture of sodium aluminate or sodium silicate or both plus small amounts of other mineral. In any event the added alkali forms with the mineral in the coffee particles a zeolite compound which thus becomes incorporated with the particles. It is for this reason that it is preferable to employ ground coffee inasmuch as the alkali penetrates the coffee particles more readily for reaction with the naturally occurring mineral in the coffee. Preferably additional zeolite material is incorporated, e. g. in the manner above described in order to increase the water-softening capacity of the coffee particles. If, however, additional zeolite material is not added it is usually desirable to not only treat coffee particles with sufficient alkali metal compound to convert minerals naturally occurring in coffee into zeolite material but also with some excess of alkali. The water-softening material that is carried in the ultimate product may be incorporated therewith by treatment with water-softening material previously prepared, by reaction of substances separately added to the coffee particles, or by reaction of added substances with material naturally occurring in the coffee.

While this invention has been described in connection with certain specific examples it is to be understood that this has been done merely for the purpose of exemplification. It is apparent that coffee particles carrying any substance that is adapted to remove water-hardening materials from water may be utilized in the practice of this invention. Preferably, however, coffee particles are treated so that advantage is taken of the minerals naturally occurring in the coffee particles in causing the coffee particles to carry a substance adapted to remove water-hardening material from water. While certain steps have been described for incorporating particular zeolite materials with coffee particles it is apparent that other zeolite materials may likewise be incorporated with coffee particles. In this connection, as mentioned above, there are a very large number of zeolite materials other than those above mentioned that are well known and which can also be availed of in the practice of this invention.

In the practice of this invention it is not essential to use chemically pure substances in treating the coffee particles. Commercial grades of alkalis, aluminum, sodium silicate, etc. may be used if desired inasmuch as small amounts of impurities such as zinc, iron, and the like are not harmful. Moreover, when it is desired to wash the treated coffee particles to remove excess free alkali the washing can be carried out using ordinary water inasmuch as the free alkali that is being washed from the particles counteracts the effect of any hardness of the water.

In using coffee particles in accordance with this invention as a water-softening material, I have found that the capacity of coffee to liberate the flavor and color which is commonly associated with coffee does not detract from the usefulness of coffee particles in the practice of this invention. Especially when coffee has been ground and used in the preparation of a beverage and when the used coffee particles have been treated with alkaline solution and with compounds of aluminum or silicon or both, the tendency to deleteriously affect the color or taste of water is not noticeable. If raw unground coffee were to be used, for example, and if there were any tendency to discolor or adversely affect the flavor of water, the coffee could, of course, be extracted with hot water to remove soluble coloring and flavoring materials before being treated for use as a water-softening material although such treatment ordinarily is not necessary. Normally, however, the coffee particles that are used in the practice of this invention would be coffee that has previously been used in the preparation of a beverage and which therefore has little tendency to discolor or adversely affect the flavor of water. In fact, it is one of the advantages of this invention that used coffee grounds which are for the most part a waste material find usefulness according to the present invention as an improved type of water-softening material. Products embodying this invention are also advantageous because they are effective in removing obnoxious odors from water treated therewith.

By the foregoing invention a water-softening material comprising coffee particles is afforded which is most advantageous both from the point of view of permitting free flow of water therethrough, very high efficiency in softening hard water, and capacity for effective regeneration. It is also advantageous from the point of view of economy and simplicity of manufacture. The new water-softening material can be used for softening water for use in laundries, boilers, hotels and in fact for any purpose and in substantially any type of water-softening installation.

I claim:

1. A method of making a water-softening material which comprises treating coffee particles with an aqueous alkaline solution in the presence of metallic aluminum, said solution being of sufficient strength to react with and render soluble the metallic aluminum.

2. A method of making a water-softening material which comprises treating coffee particles to incorporate therewith an alkali metal compound of aluminum adapted to remove water-hardening material from water and thereafter treating the particles with an aqueous bath containing alkali metal silicate.

3. A method of making a water-softening material which comprises treating coffee particles with sodium hydroxide solution in the presence of metallic aluminum, the sodium hydroxide solution being of sufficient strength to react with and render soluble the metallic aluminum.

4. A method of making a water-softening material which comprises treating coffee particles with a sodium hydroxide solution in the presence of metallic aluminum, the sodium hydroxide solution being of sufficient strength to react with and render soluble the metallic aluminum, washing the treated particles to remove excess sodium hydroxide, and then treating the coffee particles with an alkali metal silicate solution.

5. A method according to claim 4 wherein the coffee particles are dried between the washing step and the treatment with alkali metal silicate solution.

6. As a water-softening material, coffee particles coated with an alkali metal aluminate and an alkali metal silicate.

SVEIN DAHL-RODE.